United States Patent Office 3,391,748
Patented July 9, 1968

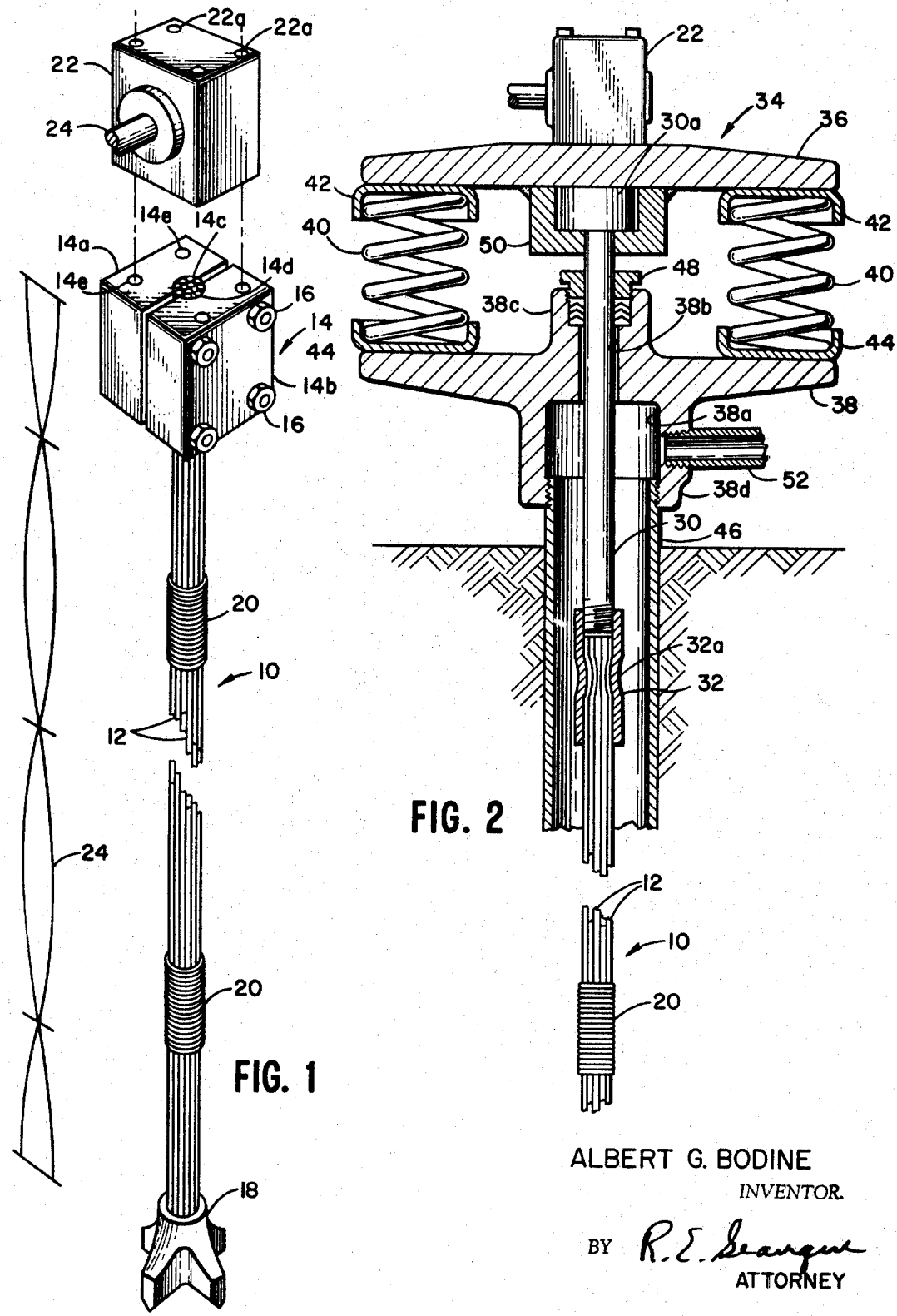

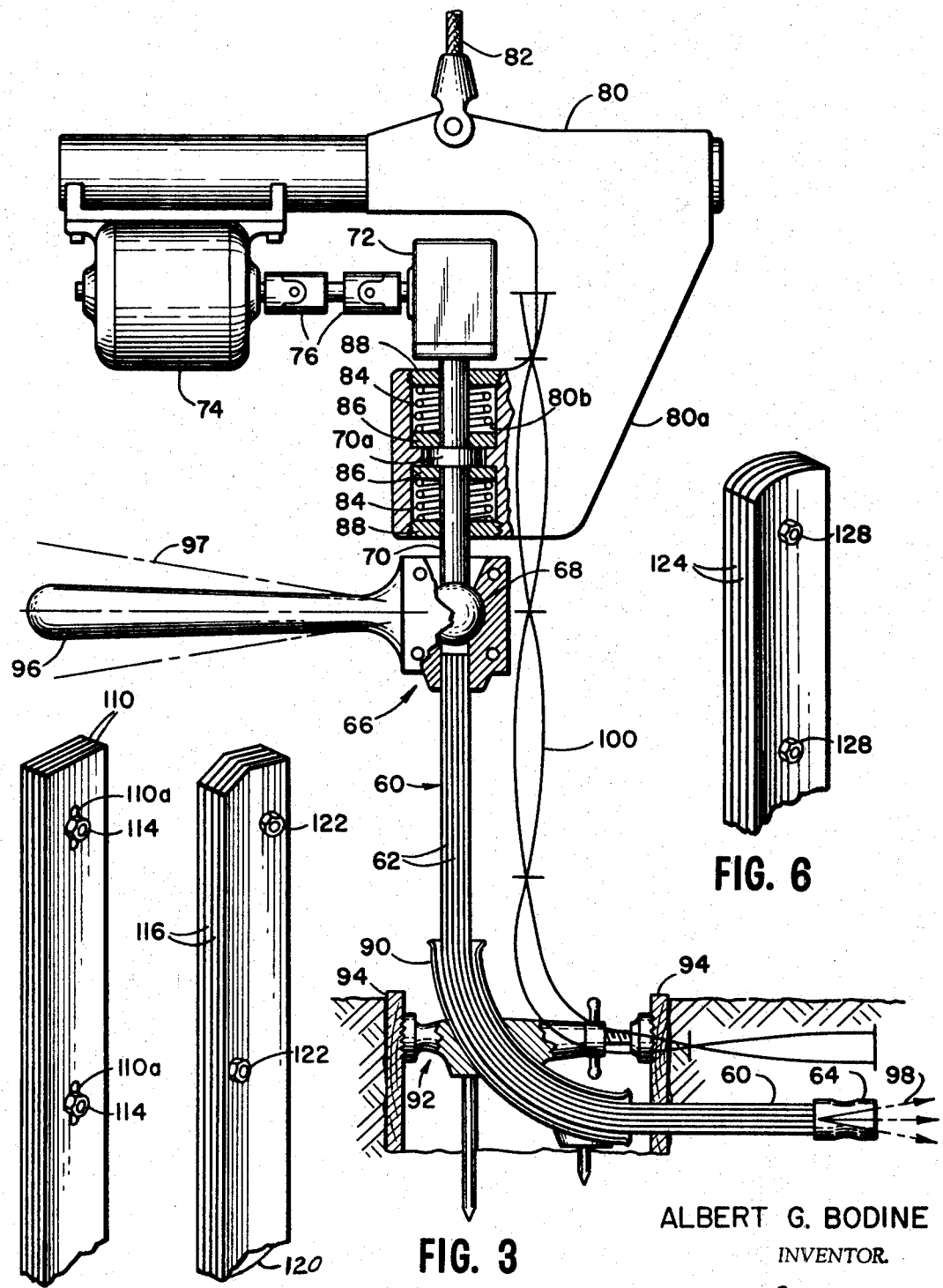

3,391,748
TRANSMISSION OF SONIC WAVES BY A COLUMN OF ELEMENTS
Albert G. Bodine, 7877 Woodley Ave., Van Nuys, Calif. 91406
Filed Jan. 24, 1966, Ser. No. 522,659
10 Claims. (Cl. 175—56)

This invention relates to the transmission of sonic energy and, more particularly, to the transmission of longitudinal elastic waves by means of a relatively slender elastic column comprising a plurality of elements bound together. The transmitted waves may result from placing the column alternately under tension and compression, or the column may be biased so that the waves may result predominantly either in variations in tension or in compression. Furthermore, the elastic column may be provided with means such as a clamp to cause an abrupt change in sonic impedance at a predetermined distance from the point of introduction of sonic energy thereto, so that a standing wave is generated in the column. Also, the frequency of the applied sonic energy can be varied so as to resonate columns of different lengths.

The elastic column comprises a plurality of elongated elements which are susceptible to elastic vibrations, i.e., cyclic elastic deformations. The column may consist of a parallel bundle of steel wires, a sandwich of long, flat slabs or slats, or other elongated nesting members. Inasmuch as the invention is aimed at transmitting only longitudinal vibrations, it is preferred that the parallel elements be bound together to a sufficient degree that relative transverse vibrations between the elements will cause energy absorption of the lateral vibrations. Thus, parasitic lateral vibrations are quickly damped out by interface friction between the various parallel elements.

It is pointed out that the invention requires that sonic energy be delivered substantially simultaneously to all of the parallel elements of the column at the same general region of the column. This can conveniently be accomplished by clamping all of the elements of the column tightly with one clamp, whereby energy delivered to the clamp is transferred uniformly to all of the elements of the column in at least the same general region. By this means, all of the sonic waves run down the elements of the column in parallel and are all in phase in any general cross-sectional region of the column. Thus, there is little or no damping of the longitudinal waves because they do not cause any relative motion between the elements comprising the columns, because the speed of sound is uniform for all elements of the columns and all of the waves start in the same phase.

The invention may be embodied in various forms such as in a sonic drill, a sonic pump or a sonic directional conduit driver, among others, and it is not intended that it be limited to any particular application. It is known from the prior art that sonic vibrations, such as may result from standing waves set up in an elastically deformable medium, are exceptionally efficient in drilling, pumping, loosening earth, etc. and require many times less input energy than mechanical devices that do not employ such vibrations. The present invention is concerned with the transmission of such sonic vibrations in the form of longitudinal elastic waves by means of a medium that suppresses transverse sonic waves, while transmitting longitudinal sonic vibrations very efficiently. Furthermore, in one embodiment, the transmission medium of the invention is bendable, so that it finds ready application in driving pipe or a mandrel through the earth in substantially a horizontal direction as, for example, in installing or aiding in the installation of a horizontally-running pipe under an existing street or building structure.

It has been found that in applications involving a solid transmission medium, such as in the sonic drill illustrated by Patent No. 9,942,849 and in the sonic pump illustrated by Patent No. 2,553,541, certain difficulties are caused by transverse vibration of the sonic transmission medium. These difficulties are virtually eliminated by the column of the present invention comprising a plurality of individual elements bound together, in that the individual elements substantially damp any tendency of the other elements to vibrate in a transverse direction.

In addition, the elements comprising the column of the present invention are generally manufactured by drawing, rather than being rolled as in the case of a solid transmission medium such as a rod. Drawn elements provide superior crystalline alignment over rolled elements. A column comprising a plurality of drawn elements provides much higher strength, and can withstand much higher stress and wave amplitude than can a solid element without breaking. Thus, it is far superior to a solid element in certain applications.

It is also pointed out that, if the column need not be flexible, a plurality of non-bendable slats may be used to constitute the column, and the slats may be provided with particular cross-sectional configurations to add rigidity to the column. For example, they may be curved or provided with an angle, so that they nest together to provide added strength to the column.

Further features and advantages of the invention will become apparent from the following description of several embodiments thereof, taken in conjunction with the accompanying drawings, in which:

FIGURE 1 is a perspective view of the sonic column of the invention embodied in a sonic drill such as shown in Patent No. 2,942,849;

FIGURE 2 is a vertical sectional view of the sonic transmission column of the invention embodied in a sonic pump such as shown in Patent No. 2,553,542;

FIGURE 3 is generally a vertical sectional view of a column of the invention embodied in a sonic directional conduit driver; and FIGURES 4, 5 and 6 are perspective views of three different forms of clamps and configurations of slabs or slats comprising a sonic column embodying the invention.

FIGURE 1 illustrates the sonic column of the invention applied to a sonic drill, such as is shown in the aforementioned Patent No. 2,942,849 to which reference is hereby made. The drill embodies a sonic column, indicated generally by the numeral 10, comprising a plurality of elements such as wires 12 bound together to form a relatively slender elastic column. The wires 12 comprising the column 10 are secured together at their tops by a clamp 14. The clamp 14 comprises two separable halves 14a and 14b, which are provided with semicircular matching grooves 14c and 14d, respectively. The column of wires is secured in the grooves 14c and 14d by conventional nuts and bolts 16 extending through suitable bores in the two halves of the clamp 14. It is pointed out that the column 10 does not extend above the upper surface of the member 14.

The bottom end of the column 10 is secured to an operating unit such as a drill bit 18 of a type suitable for sonic drilling.

The wires 12 comprising the transmission column 10 are held together intermediate the clamp 14 and the drill bit 18 by binding means such as one or more circumferential wraps 20 so that transverse vibrations are damped. In some applications where the amplitude of longitudinal vibration is quite high, it is preferable that some space be left between the coils of each wrap 20 so that it functions much in the manner of a coil spring. This prevents damping of longitudinal vibrations. However, in most systems where the amplitude of longitudinal vibration is moderate, the spacing between the coils of the wrap is of no importance.

The clamp 14 is provided with a plurality of bores 14e so that it may be firmly secured to a sonic wave generator 22 provided with matching bores 22a. The clamp 14 and the generator 22 may be secured tightly together by means of bolts (not shown) extending through the matching bores 14e and 22a.

The sonic wave generator 22 may be any one of several types. For example, those shown in the aforementioned patents are quite suitable. The generator 22 is, of course, driven by a suitable source of power such as a motor (not shown in FIGURE 1) connected thereto through a shaft 24. The generator 22 provides an oscillatory component of motion in a vertical direction, as seen in FIGURE 1, or, in other words, along the axis of the sonic transmission column 10. Because the wave generator 22 is tightly secured to the clamp 14, which is in turn clamped to the wires 12 comprising the column 10, sonic energy is delivered uniformly to all of the wires 12 at substantially the same region, the region being defined by the length of the clamp 14. Thus, all of the longitudinal sonic waves run down the wires 12 of the column in parallel and are all substantially in phase in any general cross-sectional region of the column. Little or no damping of the longitudinal waves occurs because there is substantially no relative longitudinal motion between the wires 12.

It is particularly pointed out that one of the primary advantages of the invention is obtained by making the wraps 20 loose enough so that some relative transverse movement can exist between the wires 12. This causes parasitic transverse vibrations between the wires 12 to be quickly damped out by interface friction.

The frequency of vibrations of the sonic wave generator 22 is adjusted to provide a longitudinal standing wave in the column 10 such as illustrated diagrammatically by the curve 24, which shows an anti-node at the lower surface (that is, at the cutting teeth) of the drill bit 18, to fracture and/or fluidize the earth that the bit engages. The number of nodes or, in other words, the wave length of the longitudinal vibrations set up in the transmission column 10, is of no particular importance, so long as an anti-node is present at the drill bit 18. Of course, the invention is not limited to the presence of an exact anti-node at that point, but the anti-node should not be far removed from the drill bit, or the effectiveness of the drill will be decreased, particularly in softer formations.

FIGURE 2 shows the elastic sonic column of the invention applied to a pump, such as is described in Patent No. 2,553,541. In that application, the column 10 and a solid rod 30 are joined together by a collar 32. The rod 30 is threaded into one end of the collar 32 and the column of wires 12 is inserted into the other end of the collar, which is then compressed about the wires, as at 32a, to clamp them within the collar. Oscillatory vibration is transmitted to the column 10 through the rod 30 from the wave generator 22, which is mounted on top of a supporting structure designated generally by the numeral 34.

The supporting structure 34 comprises a top plate 36 and a bottom plate 38 which are separated by coil springs 40. The top plate 36 is provided with a plurality of cup-shaped members 42 on its lower surface, each of which receives one end of a coil spring 40. The bottom plate 38 is similarly provided with a plurality of cup-shaped members 44 aligned with the members 42, each of which receives the bottom end of a coil spring 40.

The bottom plate 38 is provided with two coaxial bores 38a and 38b, the bore 38a having a well casing or tubing 46 threaded into its lower end. The rod 30, which extends into the tubing 46, extends through the bores 38a and 38b, and a stuffing box or seal 48 surrounds the rod 30 and is mounted in the upper end of a protuberance 38c on the upper side of the bottom plate 38. The rod 30 is formed with an enlarged portion 30a at its upper end which is retained within a cup-shaped member 50 welded or otherwise secured to the bottom surface of the top plate 36. An outlet pipe 52 is threaded into a lateral bore in a protuberance 38d on the base plate 38 to provide communication between the pump tubing 46 and a point of delivery for the fluid being pumped.

Sonic waves are transmitted longitudinally from the wave generator 22 through the rod 30 to the column 10. The springs 40 support the weight of the generator 22, the top plate 36, and the transmission means comprising the rod 30 and the column 10. Of course, the top plate 36 vibrates in phase with the sonic waves produced by the generator 22, and the springs 40 isolate this vibratory motion from the pump tubing 46. An operating unit (not shown) such as an impelling and check valve unit is secured to the lower end of the column 10. The operation of such a sonic pump is described in detail in the aforementioned Patent No. 2,553,541 and hence will not be described herein.

FIGURE 3 illustrates the utilization of a flexible elastic sonic transmission column 60 in a directional conduit driver. The column 60 may comprise a plurality of thin flat slabs or slats 62 which are adapted to bend in one plane. This embodiment of the invention is particularly adapted for installing or aiding in the installation of a horizontally running pipe or the like under a street or other structure, where access to the desired path cannot be obtained from a horizontal direction.

As shown, the lower end of the column 60 is secured to an operating unit such as a cutter head or drive shoe 64 which presses against the earth and rapidly penetrates the earth. As the head 64 vibrates with the output acoustic impedance of a sonic system, the earth surrounding it is fluidized and rock as well as soil becomes finely divided and enters into a dynamically suspended state wherein it flows much in the same way as a liquid.

The column 60 is secured in a two-piece fixture, designated generally by the numeral 66, which serves as a steering means by causing the slats 62 to slide relative to each other to point the cutter head 64 in various directions in a vertical plane. The ends of the slats 62 are firmly secured between the two pieces of the fixture 66 at the lower end thereof. A ball 68 is mounted within the block 66, which ball is engaged substantially opposite the slats 62 by a solid rod 70. Sonic energy is imparted to the rod 70 by means of a sonic wave generator 72, which is driven by a motor 74 through universal joints 76. The entire assembly is mounted on a frame 80 that may be raised and lowered by means of a cable 82 secured thereto. The motor 74 is secured to the under side of the frame 80, and a dependent arm 80a is provided with a bore 80b within which the sonic column is supported. The rod 70 has an enlarged portion 70a which is retained between two coil springs 84 within the bore 80b through the depending portion 80a of the frame 80. Of course, suitable washers 86 and threaded plugs 88 are employed to retain the springs 84 and the rod 70 in position within the bore 80b.

The sonic transmission column 60 is turned from a vertical to a horizontal position as it enters the earth by means of a 90° conduit 90 through which it extends. The conduit 90 may be mounted by conventional means, designated generally by the numeral 92, between the walls 94 of a pipe or other structure extending into the earth. The invention is in no way limited to the angle formed in the column 60, which may be any angle desired for a particular application.

Steering of the cutter head 64 is accomplished by raising and lowering a handle 96 attached to the fixture 66, as shown by the broken lines 97 in FIGURE 3. As the handle 96 is raised and lowered, it tilts the fixture 66 and effectively increases or decreases the relative lengths of various ones of the laminated slats and thus tilts the cutter head 64 as indicated by the broken lines 98.

It should be noted that elements 60 can be in the form of wires. Moreover, the fixture 66 can then be tipped in any desired inclination, so that drive shoe 64 can thus be steered laterally as well as vertically.

As shown diagrammatically by the curve 100, a standing wave is set up in the column 60 and the rod 70 which terminates in an anti-node at the leading edge of the cutter head 64. As previously mentioned with respect to the other embodiments of the invention, the invention is not limited to having an exact anti-node at the leading edge of the cutter, and the effectiveness of the output impedance of the cutting and fluidizing action of the apparatus can be adjusted for harder formations as the position of the anti-node is removed from the leading edge of the cutter head.

FIGURES 4, 5 and 6 illustrate three different configurations of laminated slabs or slats that may be used in various applications of the invention. In the configuration shown in FIGURE 4, substantially flat slabs 110 are secured together by means of nuts and bolts 114 which extend through slots 110a in the slabs 110. Such an arrangement, when the nuts and bolts 114 are not tightened down completely, permits relative axial or longitudinal motion between the slats 110, such as is necessary when energy is to be transmitted around a corner as in the conduit driver shown in FIGURE 3.

FIGURE 5 shows another configuration in which parallel slats 116 are formed with an angle 120 therein so that the slats 116 have an angular cross-sectional configuration. The slats 116 are secured tightly together by means of nuts and bolts 122 extending therethrough. The configuration shown in FIGURE 6 is similar to that shown in FIGURE 5, except that the slats are curved rather than angular. As shown, parallel slats 124 are secured together by nuts and bolts 128 extending therethrough. The salts 124 present a curved cross-sectional configuration. Of course, in all of the embodiments shown in FIGURES 4, 5 and 6, the slats are parallel and nest together to damp transverse vibrations. The configurations shown in FIGURES 5 and 6 are particularly useful in the applications shown in FIGURES 1 and 2 where flexibility of the sonic transmission column is not only not necessary but is undesirable.

It is apparent that many modifications may be made by one skilled in the art without departing from the true spirit and scope of the invention.

What is claimed is:

1. A sonic wave transmission column for transmitting sonic energy from a sonic wave generator, operatively associated with one end of said column, to an operating unit operatively associated with another end of said column, said column comprising a plurality of parallel elongated elements oriented to be substantially parallel to the longitudinal elastic strain in response to longitudinal nificant bending forces in said elements when subjected to longitudinal elastic strain in response to longitudinal elastic vibrations in said column from said sonic wave generator.

2. The column defined by claim 1, further including clamping means intermediate said sonic wave generator and said operating unit for clamping said elements together, whereby to damp transverse vibrations of said elements.

3. Transmission means for transmitting sonic energy from a sonic wave generator to an operating unit, comprising:
   a sonic wave transmission column having one end operatively associated with said sonic wave generator and another end operatively associated with said operating unit, said column comprising a plurality of parallel elongated elements; and
   means operatively associated with said column for sliding said elements longitudinally with respect to each other.

4. The transmission means defined by claim 3, wherein said parallel elements are slats.

5. The transmission means defined by claim 3 wherein said parallel elements are wires.

6. A sonic wave transmission column for transmitting sonic energy from a sonic wave generator, operatively associated with one end of said column, to an operating unit operatively associated with another end of said column, said column comprising a plurality of parallel elongated wires oriented to be substantially parallel to the longitudinal axis of said column and thereby prevent significant bending forces in said wires when subjected to longitudinal elastic strain in response to longitudinal elastic vibrations in said column from said sonic wave generator.

7. A sonic wave transmission column for transmitting sonic energy from a sonic wave generator, operatively associated with one end of said column, to an operating unit operatively associated with another end of said column, said column comprising a plurality of parallel elongated slats nested together to prevent transverse vibrations of said slats and oriented to be substantially parallel to the longitudinal axis of said column and thereby prevent significant bending forces in said slats when subjected to longitudinal elastic strain in response to longitudinal elastic vibrations in said column from said sonic wave generator.

8. The column defined by claim 7, wherein said slats are substantially flat.

9. The column defined by claim 7, wherein said slats are curved in cross-section.

10. The column defined by claim 7, wherein said slats are angular in cross-section.

References Cited

UNITED STATES PATENTS

| | | | |
|---|---|---|---|
| 2,858,108 | 10/1958 | Wise et al. | 175—320 X |
| 2,970,660 | 2/1961 | Bodine | 175—56 X |
| 3,301,336 | 1/1967 | Mount | 175—55 X |

CHARLES E. O'CONNELL, *Primary Examiner.*

R. E. FAVREAU, *Assistant Examiner.*

UNITED STATES PATENT OFFICE
CERTIFICATE OF CORRECTION

Patent No. 3,391,748                              July 9, 1968

Albert G. Bodine

It is certified that error appears in the above identified patent and that said Letters Patent are hereby corrected as shown below:

Column 5, line 52, "elastic strain in response to longitudinal" should read -- axis of said column and thereby prevent sig- --.

Signed and sealed this 10th day of February 1970.

(SEAL)
Attest:

Edward M. Fletcher, Jr.                    WILLIAM E. SCHUYLER, JR.
Attesting Officer                            Commissioner of Patents